UNITED STATES PATENT OFFICE.

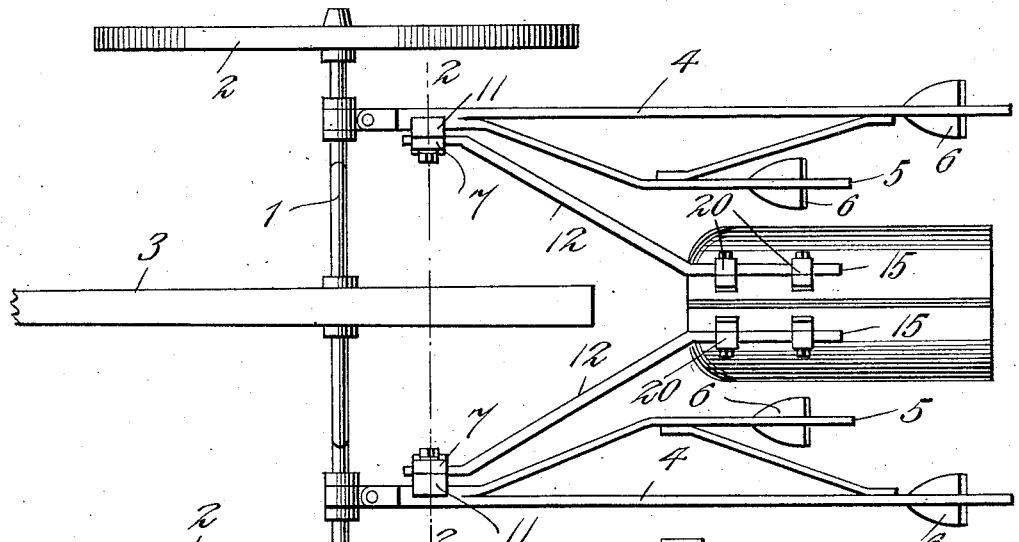
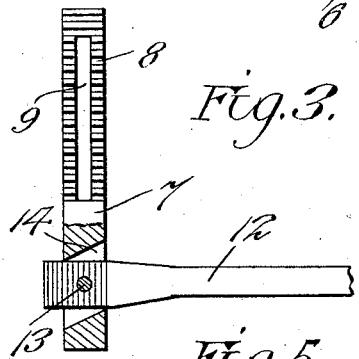
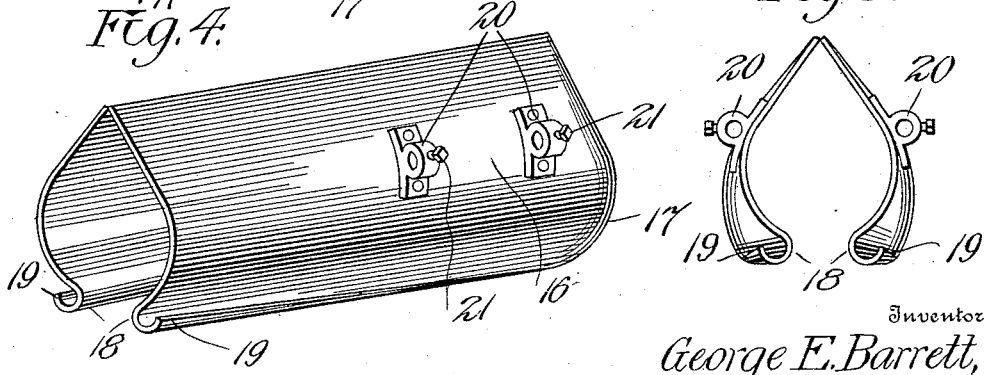

GEORGE E. BARRETT, OF SUPERIOR, WISCONSIN, ASSIGNOR OF ONE-HALF TO JOHN Z. MILLER, OF SUPERIOR, WISCONSIN.

CULTIVATOR-SHIELD.

No. 869,289.          Specification of Letters Patent.          Patented Oct. 29, 1907.

Application filed January 23, 1907. Serial No. 353,672.

*To all whom it may concern:*

Be it known that I, GEORGE E. BARRETT, a citizen of the United States of America, residing at Superior, in the county of Douglas and State of Wisconsin, have invented new and useful Improvements in Cultivator-Shields, of which the following is a specification.

This invention relates to cultivators, and one of the principal objects of the same is to provide a shield of improved construction for picking up the leaves of tender plants and permitting the cultivator shovels to throw fresh dirt up to the stalks of said plants before the leaves are permitted to drop upon the newly presented soil.

Another object of the invention is to provide a shield of two members, said members having a flaring inlet end, and a more contracted curved outlet end for the leaves of the plants, and to provide means for adjusting said shield members toward and from each other at greater or lesser angles and to adjust said members vertically for plants of different sizes and of different character.

These and other objects may be attained by means of the construction illustrated in the accompanying drawings, in which:

Figure 1 is a plan view of a cultivator made in accordance with this invention. Fig. 2 is a transverse sectional view on the line 2—2, Fig. 1. Fig. 3 is a detail view illustrating one of the hangers to which the shield members are connected by means of a pivotal bar. Fig. 4 is a perspective view of the two shield members disposed in position for operation. Fig. 5 is an end elevation of the shield members, looking at the rear or outlet end of the same.

Referring to the drawing for a more particular description of my invention, the numeral 1 designates the axle of the cultivator provided with wheels 2, and 3 is the draft tongue secured in any suitable manner to the axle 1. Pivotally connected to the axle 1 are the beams 4, said beams being provided with auxiliary inner members 5. Cultivator teeth 6 are secured to the beams 4 and 5, said cultivator teeth being arranged in different transverse planes, as shown in Fig. 1 of the drawing. Secured to the front portions of the beams 4 near the axle 1 is a pair of hangers 7, said hangers each having a corrugated face 8 and a slot 9 through which a bolt 10 is passed, said bolt extending through the beam 4 and through the corrugated nut 11 and through the slot 9 in the hanger 7, thus permitting adjustment of the hanger 7 at the required height. Bars 12 are pivoted at 13 in openings 14 in the hangers 7, said bars 12 converging to the rear and provided with parallel members 15 at their rear ends. The shield members 16 are each curved, as shown more particularly in Fig. 4, the front end 17 of said shield members being curved backwardly, and the distance between said shield members at the front end being greater than the opening between the members at the rear end, as at 18. The terminal side edges at the bottom of the members 16 are curved upward, as at 19. Bearings 20 are secured to the outer surfaces of the members 16, and secured in these bearings are the parallel members 15 of the bars 12, set screws 21 being used to adjust the members laterally and at the required inclination to conform to the heights and different kinds of plants to be cultivated.

The operation of the invention may be briefly described as follows: As the implement is drawn over the ground in line with a row of plants, the leaves are raised from the ground by the curved flaring mouth 17 of the shield, and as the implement passes along the leaves are raised inside the shield and brought closely together toward the outlet end 18 between the shield members. The curl 19 is for the purpose of presenting a round and smooth surface towards the body of the plant instead of a sharp edge which might cause injury if allowed to touch the body of the plant accidentally in operating.

From the foregoing it will be obvious that the curvature of the shield members is such that the leaves are gradually drawn in and lifted from the inlet end to the outlet end as they pass through between the two members of the shield, while at the outlet end the leaves are brought together upon the opposite sides of the plants and held up so that the fresh dirt may be thrown in close to the stalks to support them as they pass out of the shield.

Having thus described the invention, what I claim is:

1. A cultivator provided with a pair of shield members adjustably mounted upon pivoted bars, said shield members being oppositely curved and provided with a flaring mouth and a contracted outlet opening at the rear end thereof.

2. A shield for cultivators comprising two members, each being curved outwardly, downwardly, and inwardly, the inlet opening between said shield members having backwardly curved sides and the outlet opening at the rear end of said shield members being curled outwardly and upwardly at the bottom and forming a contracted outlet opening between them.

3. A shield for cultivators comprising two curved members, bearings carried by said members, bars connected to said bearings and means for adjusting said shield members upon said bars, substantially as described.

In testimony whereof, I affix my signature in presence of two witnesses.

GEORGE E. BARRETT.

Witnesses:
T. V. BADGLEY,
C. E. BADGLEY.